July 26, 1949.  G. A. PERLEY  2,477,526
THERMOMETRIC INSTRUMENT FOR MEASURING
IMPREGNITE IN CLOTH
Filed May 9, 1945

Inventor
George A. Perley
By Ralph L. Chappell
Attorney

Patented July 26, 1949

2,477,526

UNITED STATES PATENT OFFICE 2,477,526

THERMOMETRIC INSTRUMENT FOR MEASURING IMPREGNITE IN CLOTH

George A. Perley, Wyncote, Pa., assignor to the United States of America as represented by the Secretary of the Navy Application May 9, 1945, Serial No. 592,793

3 Claims. (Cl. 73—15)

This invention relates to an instrument for measuring the amount of impregnite in impregnated cloth. The operation of this instrument is based upon the heat produced when the impregnated cloth comes in contact with a mustard simulant.

This instrument has been developed to provide a practical and rapid evaluation, for shipboard and field use, of the protective capacity of impregnated clothing against vesicants. It is not intended to serve as a means for the quantitative determination of the amount of impregnite in cloth, but to provide a very satisfactory indication of whether a given cloth contains no impregnite, a moderate amount, or is fully impregnated. In other words, it is to be used for determining whether impregnated cloths offer no protection, moderate protection, or full protection against vesicants.

The determination is based upon the fact that an approximately linear relationship exists in the amount of heat liberated in the reaction between an impregnite and a mustard simulant. When a certain amount of a chemical reagent, such as phenylhydrazine, is applied to a prescribed area of fabric, say one inch in diameter, containing impregnite, there is a reaction which evolves heat. The greater the content of impregnite in a given quantity of cloth the greater the amount of heat evolved.

The determination of the amount of heat evolved in the reaction is obtained by the use of a resistance thermometer in close proximity to the heat evolving cloth. The amount of heat liberated in the reaction is indicated by the deflection of a suitable galvanometer movement. The galvanometer deflection is approximately proportional to the amount of impregnite in the cloth. It is necessary to calibrate the galvanometer movement with an identical cloth containing known amounts of impregnite. It appears that the heat effect is independent of the type of impregnite contained in the cloth. The accuracy of the determination by this method is found to be within 10 to 15 percent of the impregnite content determined by direct quantitative analysis.

The measurements are accomplished by means of an apparatus designed for use with a specified amount of a reagent on a definite area of cloth which is thermally shielded and separated by a fixed distance from a woven wire electrical resistance thermometer element. A definite voltage is always impressed across the electrical resistance bridge which has a definite initial resistance. Thus all of the variables for the temperature measurement are established.

The resistance thermometer consists of an energized Wheatstone bridge wherein temperature responsive elements are embodied as alternate arms of said bridge, and a galvanometer that is connected across said bridge for indicating the temperature rise.

The principal object of this invention is to provide an instrument for measuring the amount of impregnite in cloth.

The invention will now be described with reference to the accompanying drawing, in which.

Figure 1:
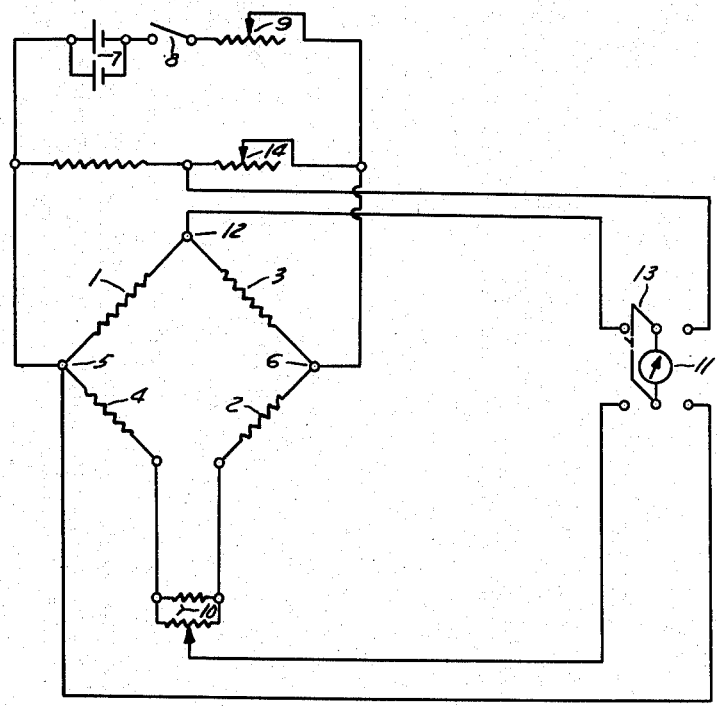
Fig. 1 is a wiring diagram employed in carrying out the present invention.
Figure 2:
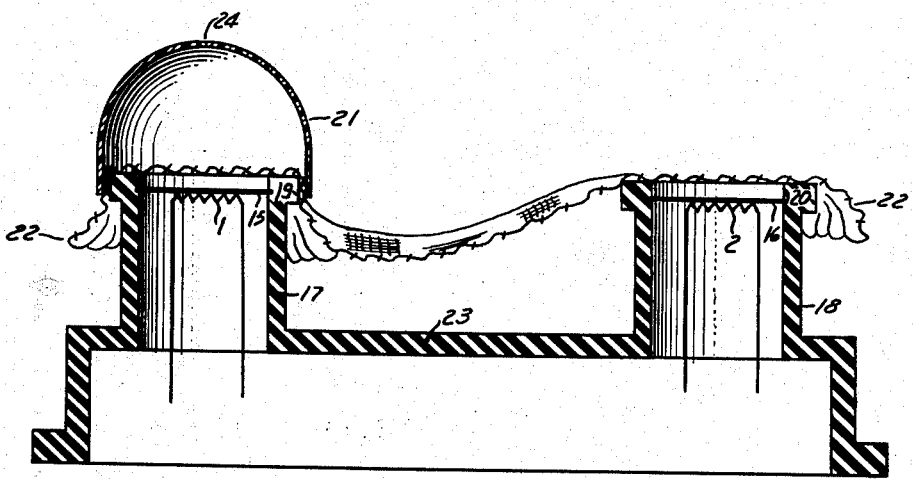
Fig. 2 is a sectional view of the thermal responsive resistance elements and their associated housings.

Referring to the drawing, the thermal responsive resistance elements form the alternate arms 1 and 2 of a Wheatstone bridge. Each is a woven wire electrical resistance. The use of a two thermal element arrangement provides means for compensating the ambient temperature changes. Either of the two elements can be used as the operating resistance; the other meanwhile being exposed to the ambient temperature for compensation purposes. In this case the sensitive resistance element 1 will be considered as the "hot" operating element; while the sensitive element 2 will be considered as the "cold" exposed compensating element. The "hot" element is the measuring side, and the "cold" element is the reference side.

The remaining branches 3 and 4 of the Wheatstone bridge are standard resistances. Across opposite bridge terminals 5 and 6 are connected the usual battery 7, switch 8, and rheostat 9. A definite voltage is always impressed across said resistance bridge which has a definite initial resistance. The voltage across the bridge is adjusted by rheostat 14, through one side of double-pole, double-throw switch 13. For best results, the bridge voltage should be adjusted to a value which gives an approximate shelf life performance to the battery, as well as a wide range of deflection to the galvanometer. The rheostat 10 arrangement provides means for balancing the bridge resulting in zero scale positionment of the microammeter 11 deflection needle which is connected across the remaining bridge terminal 12 and rheostat 10, through the remaining side of double-pole, double-throw switch 13.

The temperature responsive sensitive resistance elements 1 and 2 are cemented to the underside of gold protective discs 15 and 16 supported in short Bakelite tubes 17 and 18 cast integrally with a Bakelite supporting base structure 23. It is preferred that the resistance elements be of woven wire type. Cloth 22 to be tested is held rigidly in place over flange 19, surrounding the gold disc 15, by means of a transparent plastic cup 21 that fits loosely over said flange, but which fits tightly when fitted over the cloth in addition thereto. The cloth is thereby held firmly and tautly at a fixed distance of one-sixteenth inch above the gold cap. It is understood that the above is described in relation to the "hot" operating element 1, but applies as well to element 2 when it is operated as the "hot" element, and their functions are reversed.

Operation

The operation of this electric thermometer is dependent upon the current supply. The source of this supply is the battery which is turned "off" and "on" by switch 8. The circuit system is essentially an unbalanced Wheatstone bridge. The thermal element 1 is subjected to the temperature to be measured. For every temperature the thermal element will have a definite resistance, proportional to that temperature, and the bridge of which the thermal element forms one arm will assume an unbalanced condition in a direction and in magnitude corresponding to the particular temperature to which the thermal element is subjected. Microammeter 11 is calibrated so that its deflection affords an indication of the magnitude of the temperature and the impregnite in the cloth. The needle deflection indicates temperature in accordance with the unbalanced condition of the bridge. Initially, all arms of the bridge are of equal resistance and the bridge is, therefore, balanced. The microammeter 11 will then have no current flowing through its moving coil and will, therefore, be in its normal or zero position. When the thermal element 1 is subjected to a temperature, its resistance will increase, thereby unbalancing the bridge in a direction which causes the deflecting needle to deflect toward the right, thus indicating the increase in temperature and calibrated to indicate a measure of impregnite in the cloth.

To perform the test, first close switch 8. Then place the cloth to be tested over flange 19 of the "hot" element 1 and secure the plastic cup 21 firmly over the cloth and flange in such a manner that it is held smoothly in place. See that no wrinkles are formed on the top surface of the cloth. The cloth should also lie flat over the flange of the "cold" element 2 in order to have proper compensation for ambient temperature changes.

Throw the double-pole double-throw switch 13 to the right and adjust rheostat 9 until the microammeter needle rests over the last of the range of graduations of the scale. This adjusts the voltage across the bridge to a value which gives an approximate shelf life performance to the battery, and indicates a measure of full impregnation protection. Now open switch 13.

Adjust rheostat 10 until the microammeter 11 deflection needle rests over the zero graduation of the scale. This balances the bridge, and no current is flowing through the microammeter. This is the zero adjustment.

With a syringe, or other device, place a measured amount, say 0.1 ml., of phenylhydrazine on the center portion of the cloth, through the small opening 24 in the top of cup 21.

The heat of the reaction between the impregnite in the cloth and the phenylhydrazine affects the resistance of the thermal element 1, unbalances the bridge, and causes the microammeter deflection needle to deflect. The maximum deflection is read. Said deflection indicates a measure of impregnation protection in the cloth, since the microammeter is calibrated with an identical cloth containing known amounts of impregnite.

It is also understood that the cooling effect of a reaction could be utilized as well as the heat effect of a reaction. In this event, the galvanometer movement could be arranged for a swing clearance to the left instead of to the right as hereinbefore provided.

Mustard simulants in the form of solids, liquids, or gases can be used with this method; however, those chemicals are preferred that have a high rate of reaction with the impregnite.

What is claimed is:

1. In a thermometric instrument for measuring the amount of impregnite in cloth, comprising: a Wheatstone bridge electrical circuit having thermal responsive resistance elements in two of its alternate arms; a resistance intermediate two of its adjacent arms for balancing the bridge; a microammeter across the bridge for measuring bridge unbalance; a source of electricity for said bridge; means for controlling the potential across the bridge; gold disc elements of minimum thickness for carrying said thermal responsive elements; non-conducting tubular elements supporting each of said gold disc elements a short distance from said tube ends; a non-conducting cup element loosely fitting over one of said ends and adapted to secure cloth thereover; and a supporting structure for mounting said tubes vertically in close proximity to each other.

2. In a thermometric instrument for measuring the amount of impregnite in cloth, comprising: a Wheatstone bridge having thermal responsive resistance elements in two of its alternate arms; heat conducting disc members of minimum thickness for protecting and carrying each of said thermal responsive resistance elements; supporting means for said members; and removable means fitting over the end of one of said supporting means thermally shielding the said member therein and adapted to secure materials to said supporting means in a cooperative position above said members.

3. In a thermometric instrument for measuring the amount of impregnite in cloth, comprising; an electrical bridge having thermal responsive resistance elements in two of its alternate arms; tubular supporting means for said elements; and removable means fitting over one said supporting means thermally shielding one of said elements thereby and adapted to secure materials to said supporting means in a cooperative position with said element.

GEORGE A. PERLEY.

REFERENCES CITED

The following references are of record in the file of this patent:

UNITED STATES PATENTS

| Number | Name | Date |
|---|---|---|
| 1,206,968 | Wilsey | Dec. 5, 1916 |
| 1,946,155 | Foster | Feb. 6, 1934 |
| 2,186,948 | Alder | Jan. 16, 1940 |